(12) United States Patent
Odenmarck et al.

(10) Patent No.: US 9,581,232 B2
(45) Date of Patent: Feb. 28, 2017

(54) NOISE DAMPING ARRANGEMENT FOR A COMBUSTION ENGINE COMPONENT ASSEMBLY

(71) Applicant: VOLVO CAR CORPORATION, Gothenburg (SE)

(72) Inventors: Christer Odenmarck, Torslanda (SE); Christopher Culley, Borensberg (SE); Hayder Al-Kattan, Torslanda (SE); Andreas Stuffer, Buhl (DE); Alexander Rose, Buhl (DE); Dimitri Sieber, Buhl (DE); Christian Fechler, Buhl (DE)

(73) Assignee: VOLVO CAR CORPORATION (SE)

( * ) Notice: Subject to any disclaimer, the term of this patent is extended or adjusted under 35 U.S.C. 154(b) by 243 days.

(21) Appl. No.: 14/327,631

(22) Filed: Jul. 10, 2014

(65) Prior Publication Data

US 2015/0024885 A1    Jan. 22, 2015

(30) Foreign Application Priority Data

Jul. 17, 2013  (EP) ..................... 13176760

(51) Int. Cl.
*F16H 55/36*    (2006.01)
*F16D 3/12*     (2006.01)
(Continued)

(52) U.S. Cl.
CPC .............. *F16H 55/36* (2013.01); *F16D 3/12* (2013.01); *F16D 3/84* (2013.01); *F16F 15/121* (2013.01);
(Continued)

(58) Field of Classification Search
CPC ...... F16H 55/36; F16H 2055/366; F16H 7/02; F16D 3/12; F16D 3/84; F02B 67/06
See application file for complete search history.

(56) References Cited

U.S. PATENT DOCUMENTS 5,352,156 A * 10/1994 Klein ...................... F16F 15/12
                                                  192/212
5,569,105 A * 10/1996 Sakai ...................... F02B 67/06
                                                  474/110
(Continued)

FOREIGN PATENT DOCUMENTS

DE          4420178 A1      12/1994
DE          19652730 A1      6/1997
(Continued)

OTHER PUBLICATIONS

Extended European Search Report Dated Jaunary 8, 2014, Application No. 13176760.0-1606, Applicant Volvo Car Corporation, 6 Pages.

*Primary Examiner* — William E Dondero
*Assistant Examiner* — Robert T Reese
(74) *Attorney, Agent, or Firm* — Brooks Kushman P.C.

(57) ABSTRACT

A combustion engine component comprises an assembly of a belt pulley for driving auxiliary engine equipment and a torsional vibration damper. The assembly is adapted to be fixed on an engine crankshaft, wherein the belt pulley is of a so called decoupling type, arranged to be able to change its rotational angle relative to the crankshaft and the torsional vibration damper. The torsional vibration damper is partially positioned in a corresponding annular recess in the belt pulley, creating an annular cavity in the recess between the torsional vibration damper and the belt pulley. An annular seal ring is positioned in the annular cavity and is arranged to close off at least a part of the annular cavity from the air surrounding the assembly.

21 Claims, 7 Drawing Sheets

(51) Int. Cl.
*F16D 3/84* (2006.01)
*F16F 15/121* (2006.01)
*F16H 7/02* (2006.01)
*F02B 67/06* (2006.01)

(52) U.S. Cl.
CPC ........... F16F 15/1213 (2013.01); F16H 7/02 (2013.01); *F02B 67/06* (2013.01); *F16H 2055/366* (2013.01)

(56) References Cited

U.S. PATENT DOCUMENTS

| | | | |
|---|---|---|---|
| 6,048,284 A | 4/2000 | Gerhardt et al. | |
| 2013/0087428 A1* | 4/2013 | Antchak | F02B 67/06 192/41 S |
| 2015/0252884 A1* | 9/2015 | Serkh | F16H 55/36 474/94 |
| 2015/0345610 A1* | 12/2015 | Mende | F16H 55/36 474/171 |

FOREIGN PATENT DOCUMENTS

| | | |
|---|---|---|
| GB | 2258713 A1 | 2/1993 |
| WO | 2005085680 A1 | 9/2005 |
| WO | 2012013178 A1 | 2/2012 |

\* cited by examiner

NOISE DAMPING ARRANGEMENT FOR A COMBUSTION ENGINE COMPONENT ASSEMBLY

CROSS-REFERENCE TO RELATED APPLICATIONS

This application claims foreign priority benefits under 35 U.S.C. §119(a)-(d) to European patent application number EP 13176760.0, filed Jul. 17, 2013, which is incorporated by reference in its entirety.

TECHNICAL FIELD

The current disclosure relates to a combustion engine component comprising an assembly of a belt pulley for driving auxiliary engine equipment and a torsional vibration damper. The assembly is adapted to be fixed on an engine crankshaft, wherein the belt pulley is arranged to be able to change its rotational angle within limits relative to the crankshaft and the torsional vibration damper, and wherein the torsional vibration damper has an annular portion being positioned in a corresponding annular recess in the belt pulley, creating an annular cavity in the recess between the torsional vibration damper and the belt pulley.

BACKGROUND

In modern cars it is essential to minimize the space occupied by each of the car components, especially under the hood, since the number and complexity of not the least auxiliary equipment needed has increased during the last decades and the design of the car leaves limited space. Many components have therefore been designed to share the space effectively under the hood, especially components being more or less cooperating with each other.

The demand for both comfort and durability has also increased, encouraging the engineers to find solutions both to noise elimination and to wear problems.

Two component types that have been redesigned in parallel in order to save space, both being mounted on the same crankshaft end, include on the one hand torsional vibration dampers, TVDs, and on the other hand belt pulleys for driving auxiliary equipment like generators, water pumps, a/c pumps and servo steering pumps. They thus can come as an assembly, ready to be mounted on the end of an engine crankshaft as one component.

The above mentioned two components can be relatively tightly arranged adjacent each other, but since a modern belt pulley intended to drive auxiliary components from the crankshaft is equipped with means for dampening or decoupling the vibrations and oscillations of the crank shaft from the belt and the auxiliary equipment, the TVD and the belt pulley must leave a little space in between, allowing the belt pulley to change its rotational angle relative to the TVD. There is a cavity between the two components in the assembly, and the cavity can be the source of noise within the hearing range for a human being when the engine is running. In order to dampen noise from this type of assembly it is known to place caps or houses over the entire assembly, a non-wanted space consuming car component.

SUMMARY

The present disclosure relates to a combustion engine component, an assembly of a torsional vibration damper and a belt pulley, according to the above, which assembly comprises an annular seal ring, positioned in an annular cavity located between the TVD and the belt pulley, the seal ring being arranged to close off at least a part of the annular cavity from the air surrounding the assembly.

The annular seal member not only effectively dampens noise generated in the cavity but also prevents dirt from entering the cavity, thus prolonging the life of the assembly.

In a first embodiment of the disclosure, wherein the torsional vibration damper has a second mass positioned mainly in the recess, and wherein the belt pulley has a spring house, a radial carrier flange and a belt face portion, carried by the radial carrier flange, which all together are forming the recess, an annular first type seal ring is arranged, comprising an annular, axially extending, first type sealing lip sealing against the belt face portion, and an annular, radially extending, second type sealing lip, sealing against the radial carrier flange and an annular, supporting middle seal section, joining the first and second type sealing lips and sealing against the second mass. The first type seal ring can be floatingly arranged in the annular cavity. This first type of seal ring can be made from a relatively simple tool and in production it is possible to inspect that it has been installed, e.g., with a vision system.

In a second embodiment of the disclosure, wherein the torsional vibration damper has a second mass, positioned mainly in the recess, an annular, second type seal ring is arranged, comprising an annular, first type fastening portion, attached in the recess, which first fastening portion has an annular, axially extending third type sealing lip, which is designed to radially meet and slidingly seal against the second mass. This second type seal ring can also be made from a relatively simple tool, is possible to inspect that it has been installed and can be press fit.

In a third embodiment of the disclosure, wherein the torsional vibration damper has a secondary mass carrier portion, positioned mainly in the recess, a third type seal ring is arranged, comprising an annular first type fastening portion, attached in the recess, which first fastening portion has an annular, radially extending fourth type sealing lip, which is designed to axially meet and slidingly seal against the secondary mass carrier portion. Also this third type seal ring can be made from a simple tool, is possible to inspect that it has been installed and can be press fit. It seals against the torsional vibration damper hub, which is still in axial direction of the crankshaft.

In a fourth embodiment of the disclosure, being a combination of the second and third embodiment and wherein the torsional vibration damper has a second mass and a hub secondary mass carrier portion, positioned mainly in the recess and carrying the second mass, an annular, forth type seal ring is arranged, comprising an annular, first type fastening portion, attached in the recess, which first fastening portion has an annular, axially extending third type sealing lip, designed to radially meet and slidingly seal against the second mass and an annular, fourth type sealing lip, radially extending from the first type fastening portion, the fourth type sealing lip being designed to be biased to axially meet and slidingly seal against the hub secondary mass carrier portion. The fourth type seal ring can also be inspected to see if it has been installed, can be press fit and seals double. It seals against the torsional vibration damper hub, which is still in axial direction of the crankshaft.

Finally, in a fifth embodiment of the disclosure, wherein the torsional vibration damper has a hub secondary mass carrier portion, positioned mainly in the recess, and wherein the belt pulley has a radial carrier flange, carrying a belt face, an annular fifth type seal ring is arranged, comprising an annular second type fastening portion, attached to the hub secondary mass carrier portion. The second type fastening portion has an annular, radially extending fifth type sealing lip, which is designed to be biased and slidingly seal against the radial belt face carrier flange. This fifth type seal ring can be made from a simple tool, can be press fit and it seals against the torsional vibration damper hub, which is still in axial direction of the crankshaft.

BRIEF DESCRIPTION OF THE DRAWINGS

Some examples according to the disclosure will in the following be explained with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
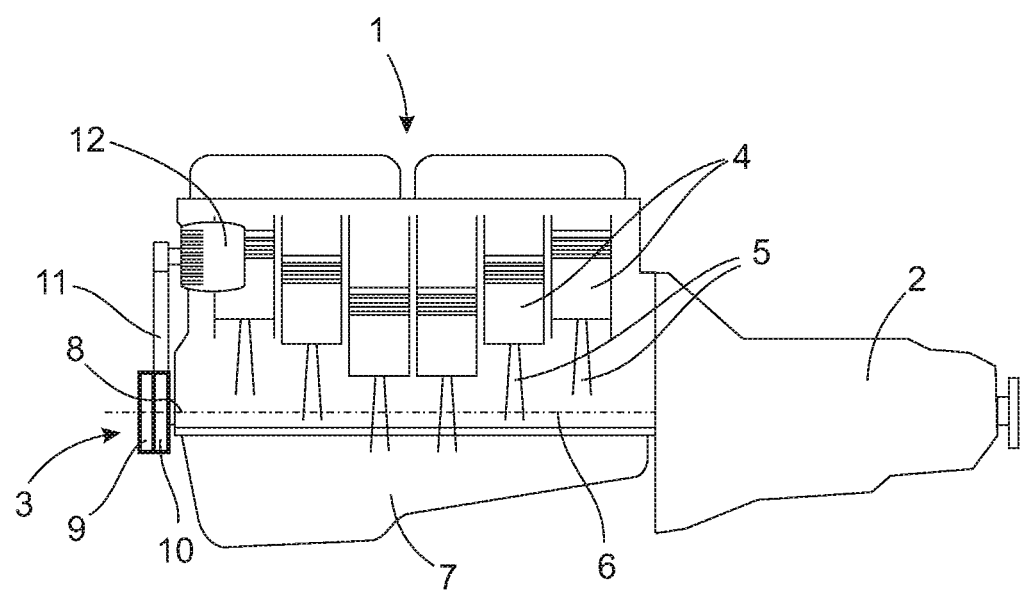
FIG. 1 shows schematically a combustion engine with an assembly of the type concerned.

As can be seen In FIG. 1, the disclosure relates to a component assembly for a combustion engine 1, shown schematically. The engine 1 is connected to a gear box 2 at a rear end and to a component assembly 3 according to the disclosure at a front end. As an example, the engine has six cylinders, each with a piston 4 and a piston rod 5, all schematically shown. The piston rods are connected to an engine crankshaft 6, shown schematically as a center line only, the arrangement being well known. Underneath, the engine is equipped with an ordinary oil pan arrangement 7. The component assembly 3 is mounted on the crankshaft 6, arranged to rotate with it, positioned at the crankshaft front end 8, and comprises a torsional vibration damper, a TVD, 9, and a belt pulley 10, the latter being in position to drive a belt 11, which in turn is arranged to drive auxiliary equipment mounted on the engine like a generator 12 and other equipment not shown, e.g., a steering servo pump, an A/C compressor or a water pump.

Figure 2:
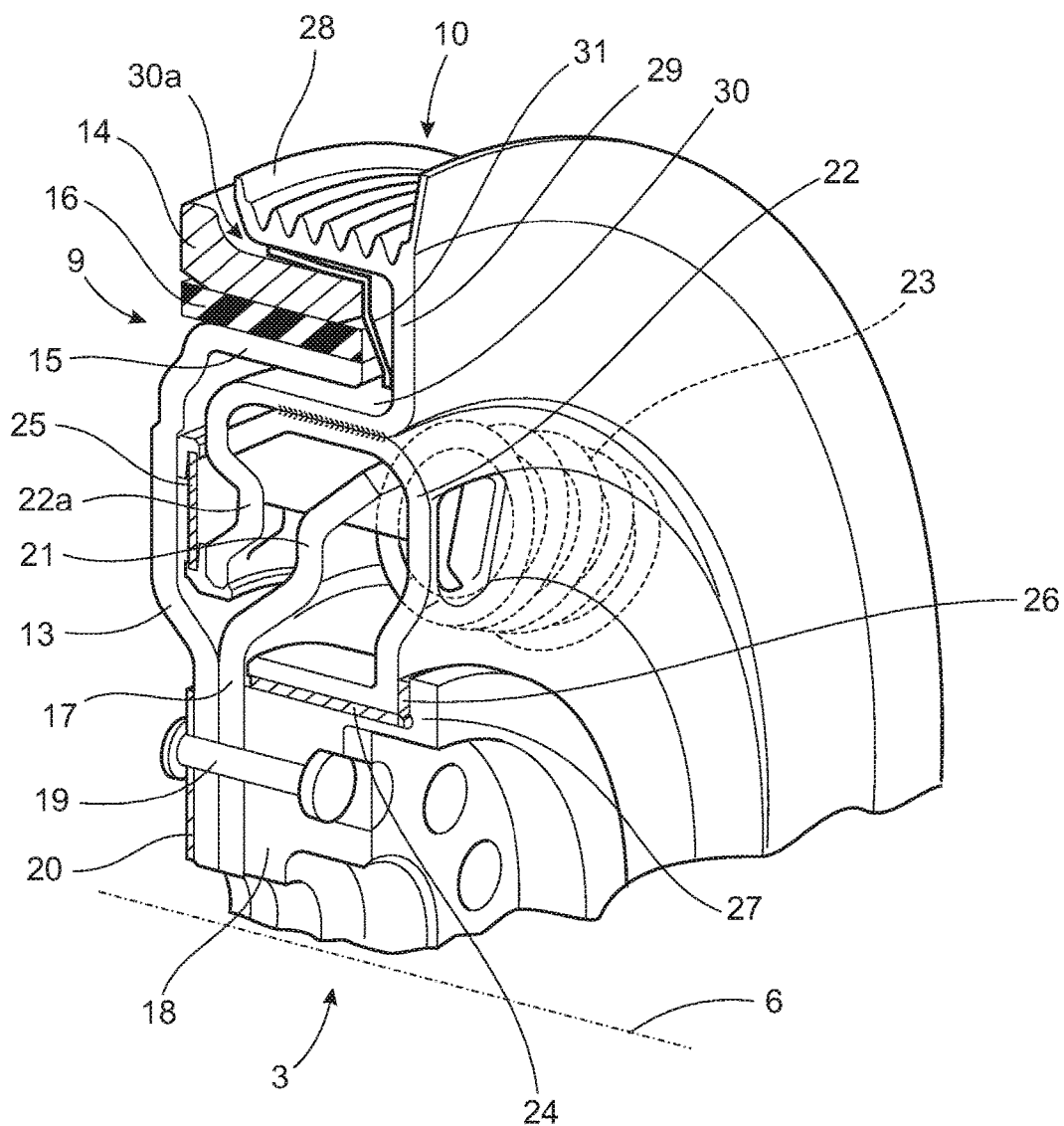
FIG. 2 shows a first embodiment of an assembly according to the disclosure in a broken cross section, at a small angle from the side.

In FIG. 2 the component assembly 3 of FIG. 1 is shown more in detail, displaying a first embodiment of the disclosure, shown in broken cross section and seen at a small angle from what is the engine side, when mounted. The assembly 3 comprises a so called TVD, a Torsional Vibration Damper, 9, which comprises a TVD hub 13, a mainly axially extending, annular TVD secondary mass 14 and an axially extending secondary mass carrier portion 15 of the TVD hub 13.

Although shown in cross section, the TVD 9 and the belt pulley 10 are of course in reality mainly rotationally symmetrical, in order to function properly. Between the secondary mass carrier portion 15 and the secondary mass 14 a mainly axially extending annular resilient ring 16 is located, which annular resilient ring 16 is bonding the TVD hub secondary mass carrier portion 15 and the TVD secondary mass together. This is in principal a quite common TVD design.

The assembly 3 also comprises a pulley, a belt pulley 10 of the so called decoupled type. The belt pulley 10 has a belt pulley first hub member 17 and a belt pulley second hub member 18 which are connected as a unit to the TVD hub 13 with assembly bolts 19, of which only one is shown. On the outside of the assembly, seen from the engine side, an assembly plate member 20 is also included in the bolted assembly. The belt pulley first hub member 17 is designed with two diametrically positioned driver fingers 21, of which only one is shown in the figure, which fingers have a function which will be disclosed in the following.

The belt pulley 10 further comprises a spring house 22, which is housing two curved coil springs 23 (only one is shown here). The spring house 22 is arranged on a plain bearing 24, which is arranged coaxially around the belt pulley second hub member 18. The driver fingers 21, the curved coil springs 23, coil spring end supports 22a, integrated in the spring house 22, all cooperate in a decoupling function such that the spring house 22 is driven by the driver fingers 21 via the coil springs 23, all in a known way, to get the decoupling function. The spring house 22 thus can change its radial angle within certain limits relative to the angle of the crankshaft 6. This is for the man skilled in the art a known decoupling function which is arranged to reduce vibrations in the crankshaft rotation pattern from the belt and the belt pulley driven auxiliary equipment.

The spring house 22 is kept in position axially on the bearing 24 with the aid of an annular disc spring 25, positioned between the spring housing 22 and the TVD hub 13, and an annular washer 26, positioned between the spring housing 22 and an end flange 27 on the belt pulley second hub member 18.

Radially and coaxially, the spring house 22 is carrying a pulley belt face portion 28, which belt face portion 28 is arranged at a distance from the spring house 22, carried by a radial belt face carrier flange 29, extending radially from the spring house 22, thus creating a recess 30, located radially outside the spring house 22, beside the radial carrier flange 29 and radially inside the pulley belt face portion 28.

In the recess 30 the lion's part of the TVD secondary mass 14, the annular resilient ring 16 and the axially extending secondary mass carrier portion 15 of the TVD hub 13 is located. Because the belt pulley spring house 22 is arranged to be allowed to change its rotational angle relative to the crankshaft 6 and thus the TVD 9, there must be a certain play between the walls of the recess 30 and the parts of the TVD secondary mass 14, the annular resilient ring 16 and the top portion 15 of the hub 13 being located in the recess, i.e., a cavity 30a is present there between. The cavity 30a runs mainly radially from the disc spring 25, mainly axially past the spring house 22, past the recess 30 and the parts of the TVD being positioned in the recess 30. Since the TVD 9 and the belt pulley 10 are mounted on the end of the engine crankshaft 6, the different parts that are defining the cavity are exposed to a lot of vibration, both axially and radially, making the cavity 30a change its form slightly, i.e., oscillate. Thus noise can be generated, the noise being sometimes containing frequencies within the hearing range of man. In order to dampen noise, which can be generated in the cavity 30a, a first type, annular seal ring 31 is located in the cavity 30a. The seal ring on the one hand stops noise from escaping the cavity 30a, which noise can disturb human beings and animals in the vicinity of or in the vehicle, and on the other hand, stops dirt from collecting in the cavity.

Figure 3:
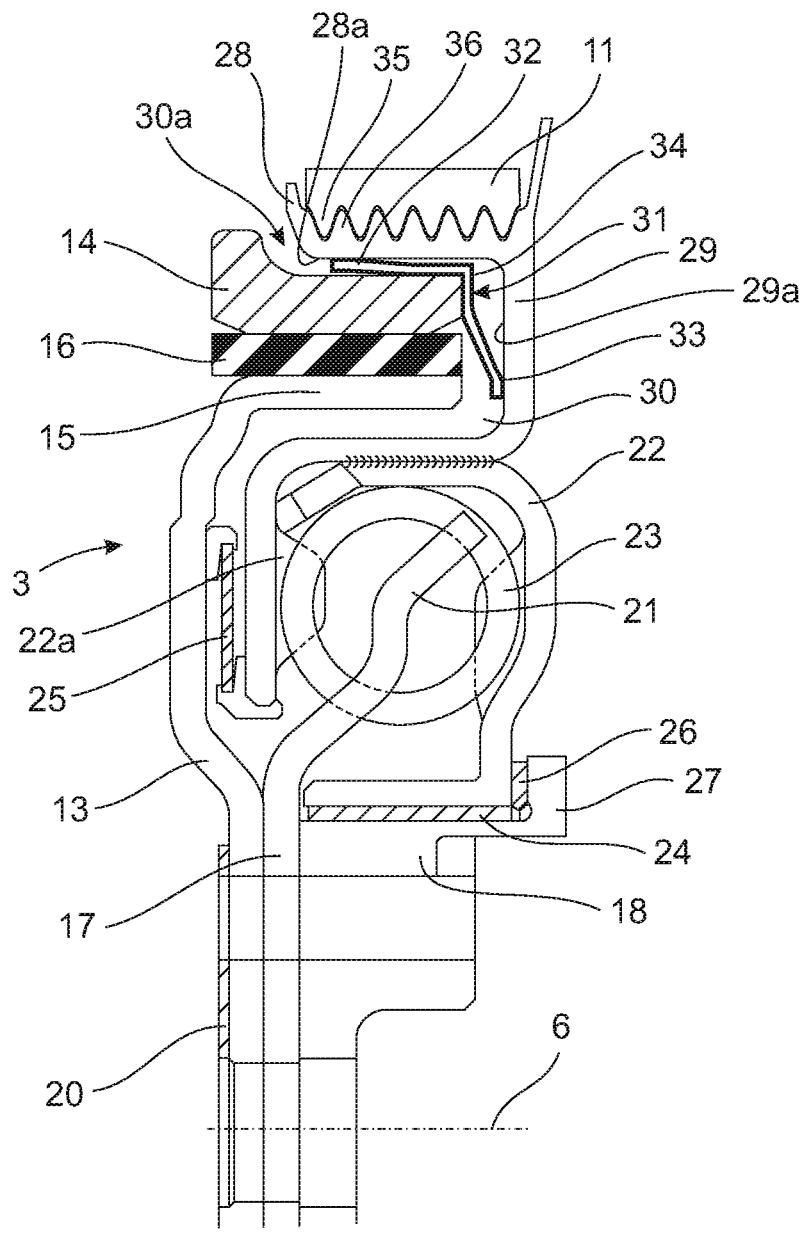
FIG. 3 shows the same embodiment as shown in FIG. 2 but in a straight cross section.

In FIG. 3, where applicable, the details shown and discussed below are denoted with the same reference numbers as in FIGS. 1 and 2 for showing the corresponding details present. In FIGS. 4-7 only the reference numbers discussed are repeated, since the FIGS. 3-7 are alike except from different embodiments of the annular seal ring.

As can be seen in FIG. 3, the annular seal ring 31, being the same first type embodiment as shown in FIG. 2, positioned in the cavity 30a, shows an annular, axially extending, first type sealing lip 32, an annular, radially extending, second type sealing lip 33 and an annular, supporting middle seal section 34, joining the first and second sealing lips 32 and 33 together. Both the first and second type sealing lips 32, 33 are designed to slidingly and sealingly meet the inner wall of the recess 30, i.e., the radially inner surface 28a of the belt face portion and the axially inner surface 29a of the carrier flange 29, respectively, while the supporting, middle seal section 34 meets sealingly against the TVD secondary mass 14. The middle section 34 can be slidingly acting against the TVD secondary mass 14, but can also be resting on it. The annular first type seal ring 31, being of a resilient material, is designed to be slightly stretched or biased when mounted, so that the first and second sealing lips 32, 33 are pressed against and slidingly seal against the recess walls, supported by the middle seal section 34, which is biased against the TVD secondary mass 14 by the sealing lips 32, 33. Thus the cavity is sealed so that nothing should be able to enter or leave the cavity, being it noise generated inside or dirt coming from the outside.

The sealing effect is secured double, since there are two sealing lips. Again, the seal does not have to be fastened to either of its supporting surfaces, since it is trapped in the recess between the two parts, the TVD 9 on the one hand and the belt pulley 10 on the other hand. This kind of mounting can be called a floating mounting. The TVD 9 and the belt pulley 10 are also free to vary their relative rotating angle on the crankshaft, of course within the freedom ratio decided by the decoupling function of the belt pulley 10.

Figure 4:
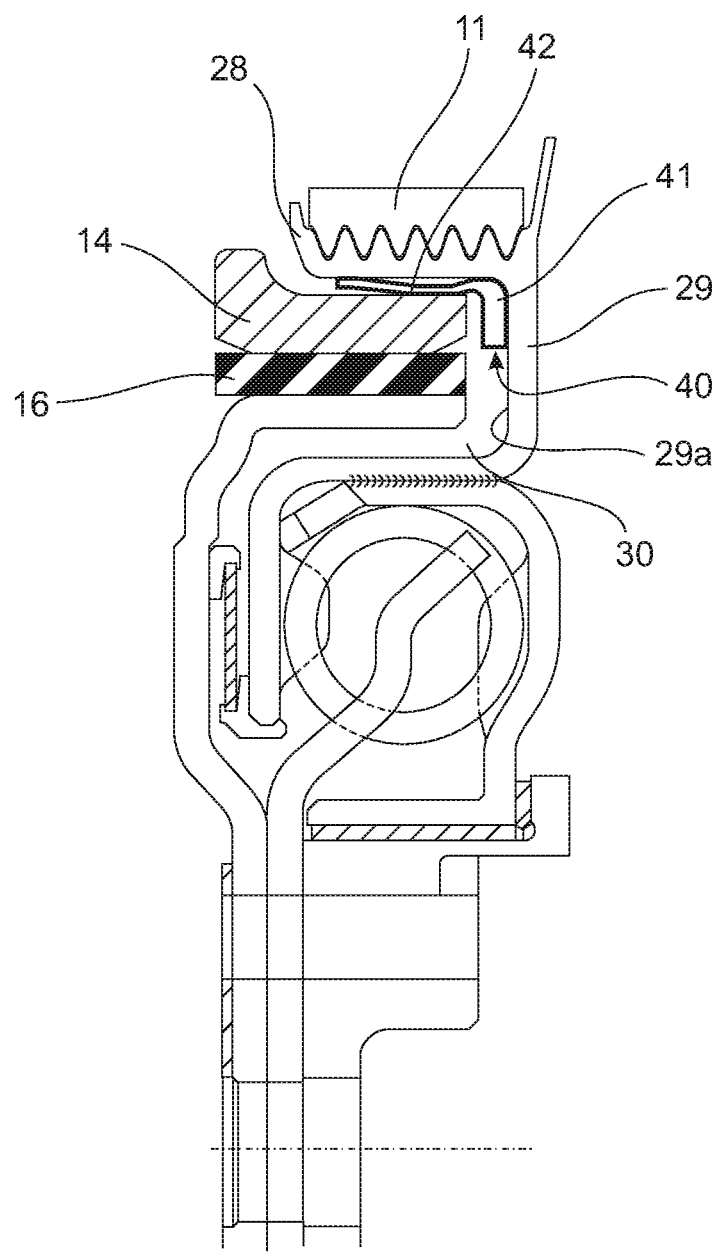
FIG. 4 shows a second embodiment of the disclosure in a broken cross section.

In the FIGS. 3-4 the driving belt 11 is also shown. The driving belt 11 and the belt face portion 28 are designed with corresponding first and second grooves 35, 36 for better grip.

In FIG. 4, a second embodiment of the disclosure is shown. An annular, second type, single lip, seal ring 40, having an annular, first type fastening portion 41, is attached in the recess 30 at the connection between the radial carrier flange 29 and the belt face portion 28 with its first type fastening portion 41. The first fastening portion 41 can be press fit into the recess 30, but other fastening methods can also be used, e.g., glue. The first type fastening portion 41 has an annular, axially extending third type sealing lip 42, which is designed to radially meet and slidingly seal against the TVD secondary mass 14 in the cavity 30a. As with the first example discussed above, the second type seal ring 40 is designed so that the third type sealing lip 42 is biased against the TVD secondary mass 14, when mounted in place. The third type sealing lip 42 is funnel shaped to simplify assembly, but this is not a must. Reasons for not having it could be e.g., manufacturing reasons.

Figure 5:
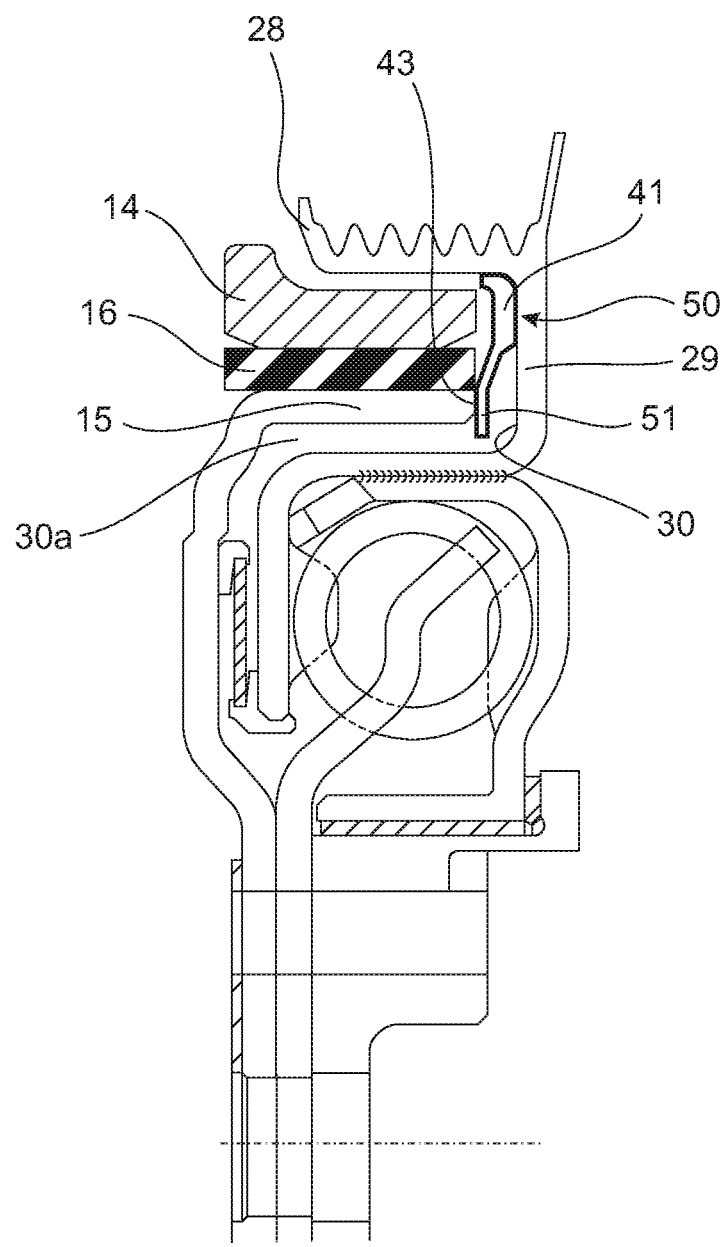
FIG. 5 shows a third embodiment of the disclosure in a broken cross section.

In a third embodiment, shown in FIG. 5, an annular, third type, seal ring 50, having an annular, first type fastening portion 41 equal to the fastening portion of the second embodiment, is attached in the same way as in the second embodiment in the recess 30 at the connection between the radial carrier flange 29 and the belt face portion 28 with its first fastening portion 41. The first fastening portion 41 can be press fit into the recess 30, but other fastening methods can also be used, e.g., glue. The first fastening portion 41 in this embodiment has an annular, radially extending single fourth type sealing lip 51, which is designed to axially meet and slidingly seal against the TVD, or, to be more exact, against an end surface 43 of the second mass carrier portion 15 of the TVD 13, the second mass carrier portion 15 of the TVD 13 and its end surface 43 being located on the radially located inside of the annular, resilient ring 16 and inside the cavity 30. As with the first example discussed above, the third type seal ring 50 is designed so that the fourth type sealing lip 51 is biased against the TVD second mass carrier portion 15, when the third type seal 50 is mounted in place.

Figure 6:
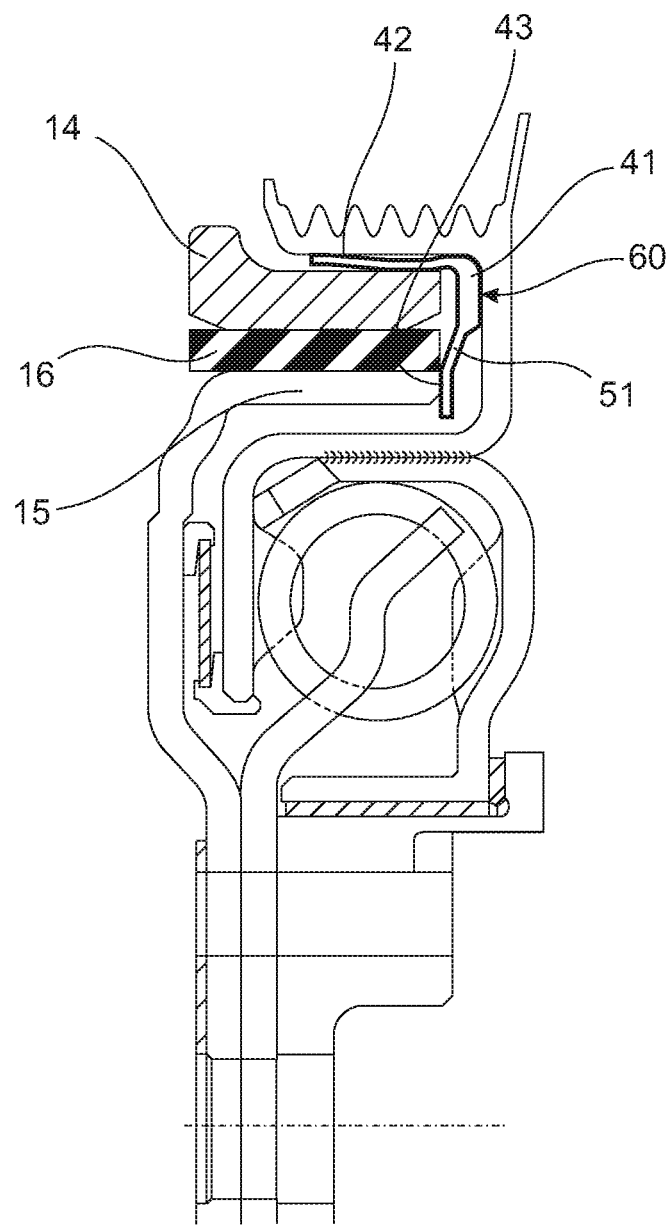
FIG. 6 shows a fourth embodiment of the disclosure in a broken cross section.

In FIG. 6, a fourth embodiment of the disclosure is shown, being a combination of the second and third embodiments. An annular, fourth type sealing ring 60 having an annular, first fastening portion 41, equal to the one used in the second and third embodiment of the disclosure, is attached in the recess 30 at the connection between the radial carrier flange 29 and the belt face portion 28 with its first fastening portion 41. Of course also here the fastening portion 41 can be press fit into the recess 30, but other fastening methods can also be used, e.g., glue. The fastening portion 41 also here, like in the second embodiment of the disclosure, has an equally, axially extending third sealing lip 42, which radially meets and slidingly seals against the TVD secondary mass 14. In addition, like in the third embodiment, this fourth embodiment shows a fourth type sealing lip 51, radially extending from the fastening portion 41. The fourth type sealing lip 51 is designed to be biased to meet and slidingly seal against the TVD, or, to be more exact, against the end surface 43 of the second mass carrier portion 15 of the TVD 13, the end surface 43 being located on the inside of the annular, resilient ring 16 and in the cavity 30. The third sealing lip 42 is, as it is equal to the one in the second embodiment, funnel shaped to simplify assembly.

Figure 7:
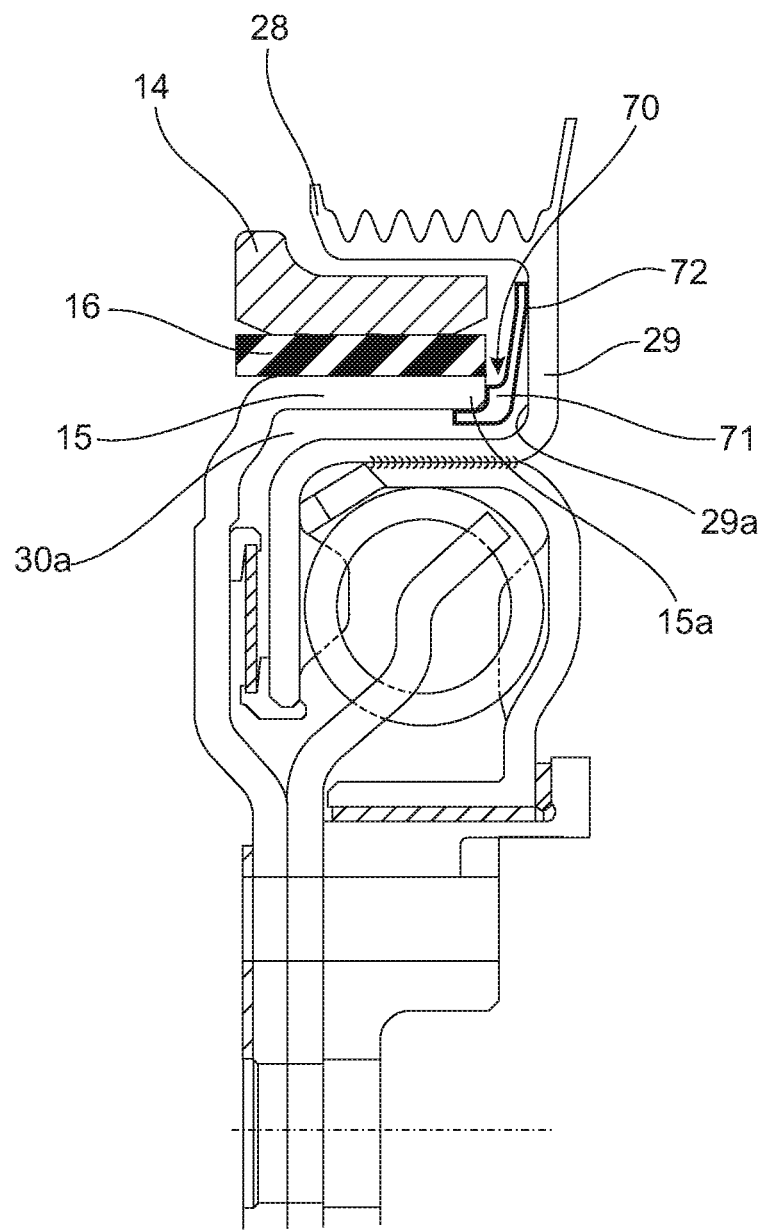
FIG. 7 shows a fifth embodiment of the disclosure in a broken cross section.

A fifth embodiment of the disclosure is shown in FIG. 7. An annular, fifth type sealing ring 70, having an annular, second type fastening portion 71, is attached to the second mass carrier portion 15 of the TVD hub 13 at the second mass carrier portion inner end 15a, radially located at the end inside. The second type fastening portion 71 can be designed to be press fit, but it can alternatively be attached in other ways, e.g., glued. Extending radially outwardly from the second fastening portion 71 the fifth type sealing ring 70 has an annular, fifth type sealing lip 72, which is designed to be biased and slidingly sealing against the axially inner surface 29a of the radial carrier flange 29.

The invention concerned here is not limited to the examples shown on the drawings and described above but is defined by the accompanying claims. Thus the details of the TVD and the decoupling belt pulley per se can be different, as long as the invention related parts are not concerned. Since the different embodiments of the seal rings and their sealing lips are all annular, all the different parts of the assembly that are engaged by the sealing lips are also per definition annularly continuous. The seal rings can be made from any suitable resilient material, including plastic or rubber. Further, the seal ring could for instance be made from foam or a solid that could for example be sprayed onto the assembly, e.g., a rubber material.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A noise-damping assembly for a combustion engine, the assembly being adapted to be fixed on an engine crankshaft and comprising:
   a belt pulley for driving auxiliary engine equipment and a torsional vibration damper, wherein the belt pulley is of a decoupling type and is arranged to be able to change its rotational angle relative to the crankshaft and the torsional vibration damper, and the torsional vibration damper is partially positioned in a corresponding annular recess in the belt pulley, creating an annular cavity in the recess between the torsional vibration damper and the belt pulley, and wherein the assembly further includes a noise-damping annular seal ring positioned in the annular cavity and being arranged to close off at least a part of the annular cavity from air surrounding the assembly, the annular seal ring comprising a resilient material and designed to be biased against and slidingly seal against an inner wall of the recess and/or the torsional vibration damper.

2. The assembly according to claim 1 wherein the torsional vibration damper comprises a mass positioned mainly in the recess, and the belt pulley comprises a spring housing, a radial carrier flange, and a belt face portion carried by the radial carrier flange and forming the recess, and wherein the annular seal ring comprises an annular axially extending first sealing lip sealing against the belt face portion, an annular radially extending second sealing lip sealing against the radial carrier flange, and an annular supporting middle seal section joining the first and second sealing lips together and sealing against the mass.

3. The assembly according to claim 2 wherein the annular seal ring is floatingly arranged in the annular cavity.

4. The assembly according to claim 1 wherein the torsional vibration damper comprises a mass positioned mainly in the recess, and wherein the annular seal ring comprises an annular fastening portion attached in the recess, the fastening portion having an annular, axially extending sealing lip, which is designed to radially meet and slidingly seal against the mass.

5. The assembly according to claim 4 wherein the seal ring is press fit in the recess.

6. The assembly according to claim 1 wherein the torsional vibration damper comprises a hub mass carrier portion carrying a mass and being positioned mainly in the recess, and wherein the annular seal ring comprises an annular fastening portion attached in the recess, the fastening portion having an annular radially extending sealing lip, which is designed to axially meet and slidingly seal against the hub mass carrier portion.

7. The assembly according to claim 6 wherein the seal ring is press fit in the recess.

8. The assembly according to claim 1 wherein the torsional vibration damper comprises a mass and a hub mass carrier portion carrying the mass and being positioned mainly in the recess, and wherein the annular seal ring comprises a fastening portion attached in the recess, the fastening portion having an annular, axially extending sealing lip designed to radially meet and slidingly seal against the mass, and an annular sealing lip radially extending from the fastening portion, the sealing lip being designed to be biased to axially meet and slidingly seal against the hub mass carrier portion.

9. The assembly according to claim 8 wherein the seal ring is press fit in the recess.

10. The assembly according to claim 1 wherein the torsional vibration damper comprises a hub mass carrier portion positioned mainly in the recess, and the belt pulley has a radial carrier flange carrying a belt face, and wherein the annular seal ring comprises an annular fastening portion attached to the hub mass carrier portion, the fastening portion having an annular, radially extending sealing lip, which is designed to be biased and slidingly sealed against the radial carrier flange.

11. The assembly according to claim 10 wherein the seal ring is press fit to the hub mass carrier portion.

12. A noise-damping component assembly adapted to be fixed on an engine crankshaft of a combustion engine, the assembly comprising:
   a belt pulley for driving auxiliary engine equipment;
   a torsional vibration damper partially positioned in a corresponding annular recess in the belt pulley, such that an annular cavity is present between the torsional vibration damper and the belt pulley; and
   an annular seal ring positioned in the annular cavity and being arranged to close off at least a part of the annular cavity from air surrounding the assembly;
   wherein the belt pulley is configured to be able to change its rotational angle relative to the crankshaft and the torsional vibration damper, the annular noise seal ring comprising a resilient material and designed to be biased against and slidingly seal against an inner wall of the recess and/or the torsional vibration damper.

13. The assembly according to claim 12 wherein the torsional vibration damper comprises a mass positioned mainly in the recess, and the belt pulley comprises a spring housing, a radial carrier flange, and a belt face portion carried by the radial carrier flange and forming the recess, and wherein the annular seal ring comprises an annular axially extending first sealing lip sealing against the belt face portion, an annular radially extending second sealing lip sealing against the radial carrier flange, and an annular supporting middle seal section joining the first and second sealing lips together and sealing against the mass.

14. The assembly according to claim 13 wherein the annular seal ring is floatingly arranged in the annular cavity.

15. The assembly according to claim 12 wherein the torsional vibration damper has a mass positioned mainly in the recess, and wherein the annular seal ring comprises an annular, first fastening portion attached in the recess, the first fastening portion having an annular, axially extending sealing lip that is designed to radially meet and slidingly seal against the mass.

16. The assembly according to claim 12 wherein the torsional vibration damper has a mass carrier portion carrying a mass and being positioned mainly in the recess, and wherein the annular seal ring comprises an annular first fastening portion attached in the recess, the first fastening portion having an annular radially extending sealing lip that is designed to axially meet and slidingly seal against the mass carrier portion.

17. The assembly according to claim 16 wherein the seal ring is press fit in the recess.

18. The assembly according to claim 12 wherein the torsional vibration damper has a mass and a mass carrier portion carrying the mass and being positioned mainly in the recess, and wherein the annular seal ring comprises a first fastening portion attached in the recess, the first fastening portion having an annular, axially extending sealing lip designed to radially meet and slidingly seal against the mass, and an annular sealing lip radially extending from the first fastening portion and being designed to be biased to axially meet and slidingly seal against the mass carrier portion.

19. The assembly according to claim 18 wherein the seal ring is press fit in the recess.

20. The assembly according to claim 12 wherein the torsional vibration damper comprises a mass carrier portion positioned mainly in the recess, and the belt pulley has a radial carrier flange carrying a belt face, and wherein the annular seal ring comprises an annular, fastening portion attached to the mass carrier portion, the fastening portion having an annular, radially extending sealing lip that is designed to be biased and slidingly sealed against the radial carrier flange.

21. A noise-damping component assembly adapted to be fixed on an engine crankshaft of a combustion engine, the assembly comprising:

a belt pulley for driving auxiliary engine equipment;

a torsional vibration damper partially positioned in a corresponding annular recess in the belt pulley, such that an annular cavity is present between the torsional vibration damper and the belt pulley; and an annular seal ring positioned in the annular cavity and being arranged to close off at least a part of the annular cavity from air surrounding the assembly;

wherein the torsional vibration damper comprises a mass positioned mainly in the recess, and the belt pulley comprises a spring housing, a radial carrier flange, and a belt face portion carried by the radial carrier flange and forming the recess, and wherein the annular seal ring comprises an annular axially extending first sealing lip sealing against the belt face portion, an annular radially extending second sealing lip sealing against the radial carrier flange, and an annular supporting middle seal section joining the first and second sealing lips together and sealing against the mass, and wherein the belt pulley is configured to be able to change its rotational angle relative to the crankshaft and the torsional vibration damper.

\* \* \* \* \*